April 12, 1932. A. D. STODDARD 1,853,584
HOSE CLAMP
Filed Feb. 17, 1931
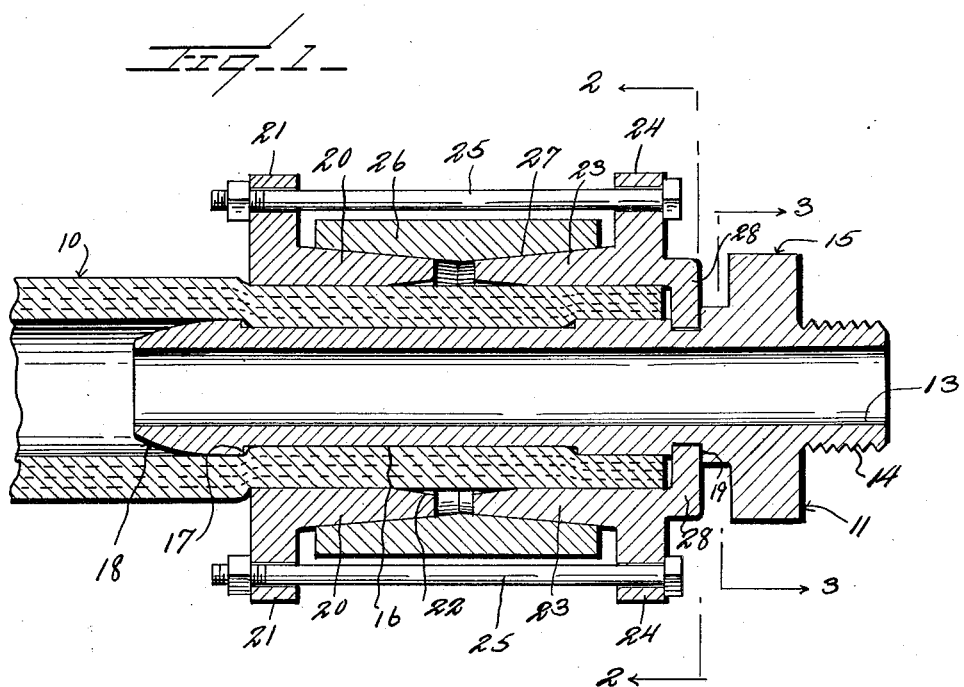
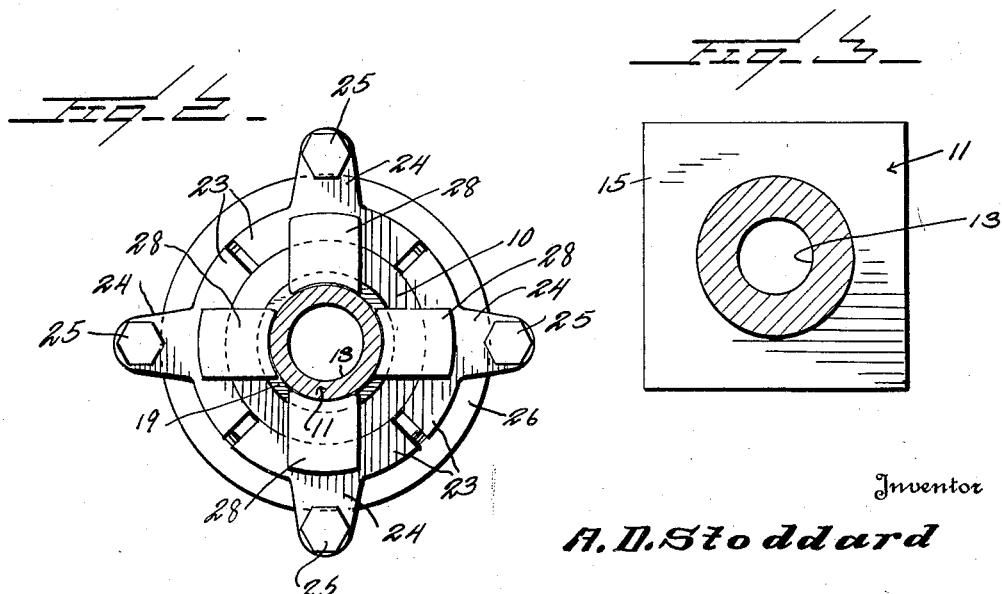
Inventor
A. D. Stoddard
By Watson E. Coleman
Attorney Patented Apr. 12, 1932

1,853,584

UNITED STATES PATENT OFFICE

ALBERT D. STODDARD, OF DUNCAN, OKLAHOMA

HOSE CLAMP

Application filed February 17, 1931. Serial No. 516,430.

The present invention relates to clamping devices and more particularly to hose clamps or the like.

An object of this invention is to provide a clamp by means of which a flexible hose may be securely mounted on a metallic connection so that the hose will not be forced off of the connection through increased pressure applied to the hose.

Another object of this invention is to provide a novel clamp which is particularly designed for use in well drilling operations whereby the clamp may be securely and firmly mounted on a metallic connection so that it will not be broken off of the connection upon increase in the pressure applied thereto.

A further object of this invention is to provide a clamp of this kind which is so constructed that it may be readily positioned about the end of the hose and tightened about the hose without in any way injuring the end of the hose which is attached to the metallic connection.

The above and various other objects and advantages of this invention will in part be described in and in part be understood from the following detailed description of the present preferred embodiment, the same being illustrated in the accompanying drawings, wherein:—

Figure 1 is a longitudinal section taken substantially through the longitudinal center of a device constructed according to the preferred embodiment of this invention;

Figure 2 is a sectional view partly in detail taken on the line 2—2 of Figure 1, and Figure 3 is a sectional view taken on the line 3—3 of Figure 1.

Referring to the drawings wherein like numerals of reference designate corresponding parts throughout the several views, the numeral 10 designates generally a flexible or elastic hose such as a hose commonly used in well drilling operations, and the numeral 11 designates generally a metallic connection or nozzle which is adapted to be connected to the well drilling equipment for the purpose of forcing mud, cement or the like into the well.

This connection 11 is provided with a bore 13 therethrough and one end of the connection is threaded, as at 14, and a nut portion 15 is provided adjacent the threaded end 14 so as to permit the application of a wrench for mounting of the connection 11 on the equipment.

The connection 11 at a point outwardly from the nut 15 is provided with a reduced portion 16, and the outer end of this connection 11 is provided with an enlarged shoulder 17 which terminates in an inwardly curved portion 18 which extends into the interior of the hose 11, this curved portion 18 being provided so as not to cut the body of the hose by the enlarged outer head portion of the connection 11. The connection 11 is also provided with an annular groove 19, the purpose for which will be hereinafter described.

In order to firmly mount the hose 10 on the metallic connection 11, I have provided a plurality of clamping members which are adapted to engage the periphery of the hose 10, these clamping members comprising an outer movable clamping member 20 in the form of a wedge or tapering body which is provided at the outer end thereof with an upstanding apertured lug 21.

The inner surface of the wedge portion 20 is curved to conform substantially to the curved surface of the hose 10, and the inner end of the wedges 20 are outwardly flared, as at 22, so that when the wedges 20 are forced inwardly, the inner ends thereof will not cut or injure the body of the hose 10.

A fixed clamping wedge 23, which is of a construction somewhat similar to the movable wedge 20, is mounted on the periphery of the hose 10 oppositely from the wedge 20 and is provided with an outstanding apertured lug 24 through which a tightening bolt or member 25 extends, this bolt 25 extending also through the outstanding lug 21 of the movable wedge 20.

A collar 26 is disposed about the wedges 20 and 23 and is provided with a tapering inner surface which tapers inwardly from each end thereof, so that when the outer surface of the wedges 20 and 23 engage the inner tapering surface 27 of the collar or ring 26, the wedges will be forced inwardly and will force the body of the hose 10 into the reduced portion 16 of the metallic connection 11.

The wedges 23 are provided at the inner ends thereof with inwardly extending arms 28 which extend into the annular groove 19 of the connection 11, so that the inner wedge 23 will be held against movement with respect to the metallic connection 11.

It will be obvious that any desired number of wedges 20 and 23 may be disposed about the periphery of the hose 10, and if considered necessary, the width of the wedges 20 and 23 may be such that the entire periphery of the hose 10 will be substantially covered by the wedges 20 and 23, sufficient distance only being left between the various wedges so as to permit longitudinal movement of the wedges for forcing the hose 10 into the restricted portion 16 of the metallic connection 11.

It will be obvious from the foregoing, that a relatively simple, but at the same time practical hose clamp has been devised by means of which the end of a flexible hose can be readily attached to a metal connection or nozzle and also by means of which the hose may be readily unclamped or removed from the connection without injury to the clamped portion of the hose.

In the use of this device, the nozzle or metallic connection 11 may be attached to the well drilling equipment at the desired point and the end of the hose 10 slipped over the body of the connection 11 until the hose extends over the reduced portion 16. The collar 26 may then be slipped over the hose and the wedges 20 and 23 placed between the collar 26 and the periphery of the hose 10. The bolts 25 may then be tightened so as to force the outer clamping wedges 20 inwardly and also move the collar 26, so that the inner clamping members 23 will cooperate with the outer clamping members 20 to force the body of the hose 10 into the reduced portion 16. The arms 28 of the inner wedge members 23 will extend into the annular groove 19 and prevent any longitudinal movement of the inner wedge member 23.

It is, of course, understood that various changes and modifications may be made in the details of construction and design of the above specifically described embodiment of this invention without departing from the spirit thereof, such changes and modifications being restricted only by the scope of the following claims.

I claim:—

1. A hose clamp of the character described comprising in combination a tubular connector adapted to extend inwardly of one end of a hose and having a reduced intermediate portion, a ring loosely mounted about the hose, a plurality of wedge members interposed between the ring and the peripheral portion of the hose and maintaining a portion of the hose in said reduced portion, and means for moving said wedge members one toward the other, said means including ears carried by said members and bolts engaging said ears for drawing abutting members toward each other.

2. A hose clamp of the character described comprising in combination an elongated tubular connector, threads mounted on one end of said connector, said connector having an intermediate reduced portion and an annular groove positioned intermediate the reduced portion and the threads, a ring loosely mounted about the hose, wedge members interposed between the ring and the periphery of the hose, means carried by certain of said wedge members and engaging in said annular groove of said connector whereby to hold certain of said wedge members against movement longitudinally of the connector, and means for moving the remaining wedge members toward said certain wedge members whereby to dispose a portion of the hose within said reduced portion.

3. A hose clamp of the character described comprising in combination a tubular connector having one end thereof threaded and an intermediate reduced portion, said connector having also an annular groove disposed between the reduced portion and the threaded portion thereof, a ring loosely mounted about said hose, said ring having an inwardly tapering inner surface, a plurality of wedge members extending inwardly from one end of said ring and disposed between the ring and the hose, a plurality of fixed wedge members interposed between the ring and the hose and positioned oppositely from said first wedge members, means carried by said latter wedge members and engaging in said annular groove of said connector whereby to hold said latter wedge members against longitudinal movement, and means for tightening said wedge members whereby to force a portion of the hose into the reduced portion of said connector.

4. A hose clamp of the character described comprising in combination a tubular connector having threads at one end, said connector having a reduced intermediate portion, a ring loosely engaging about the periphery of a hose mounted on said connector, a plurality of outer wedge members interposed between the ring and the periphery of the hose, apertured lugs mounted on said outer wedge members, a plurality of inner wedge members, coacting means carried by said tubular member and said inner wedge members whereby to hold said inner wedge members against longitudinal movement with respect to said connector, apertured lugs mounted on said inner wedge members, and tightening bolts engaging said apertured lugs of said inner and said outer wedge members whereby to draw said wedge members one toward the other and coactively force a portion of the body of said hose into the reduced portion of said connector.

In testimony whereof I hereunto affix my signature.

ALBERT D. STODDARD.